United States Patent
Andrews

[15] 3,669,204
[45] June 13, 1972

[54] SURFACE, MATERIAL AND HEALTH PROTECTIVE COMBINATION DEVICE

[72] Inventor: Peter Andrews, 190 Gebhardt Road, Penfield, N.Y. 14526

[22] Filed: Feb. 21, 1966

[21] Appl. No.: 532,831

Related U.S. Application Data

[62] Division of Ser. No. 288,159, June 17, 1963, abandoned.

[52] U.S. Cl.............................................180/69.1, 184/106
[51] Int. Cl.............................................................B67d 25/20
[58] Field of Search....................180/69.1; 184/106; 195/34; 206/1; 215/100.5; 229/2.5; 220/85; 222/108

[56] References Cited

UNITED STATES PATENTS

| | | | |
|---|---|---|---|
| 1,444,310 | 2/1923 | Fishburn | 180/69.1 |
| 2,234,637 | 3/1941 | Taggart | 195/3 H X |
| 2,742,398 | 4/1956 | Zobell | 195/3 H |
| 2,783,848 | 3/1957 | Beskid | 180/69.1 |
| 2,931,453 | 4/1960 | Inglese | 180/69.1 |
| 2,975,835 | 3/1961 | Bond | 195/3 H |
| 3,062,323 | 11/1962 | Oganovic | 180/69.1 |

*Primary Examiner*—Benjamin Hersh
*Assistant Examiner*—Milton L. Smith

[57] ABSTRACT

A fluid retaining receptacle device having at least one separate material retained therein for retaining fluid which drips therein generally from the motor or a fluid retaining housing portion of the motor vehicle which may be a car, truck, bus and a boat. The receptacle device may be disposed under at least one portion of the motor vehicle, may be removably secured and supported in at least one portion of a structure which is removably secured and suspendingly disposed beneath at least one portion of the motor vehicle. Absorbent, porous, catalyst material and/or oil eating bacteria and the like is retained in the device for increasing the rate of oxidation and thickening of the retained fluid, whereby at least lives are saved and accidents are prevented on the highways; fluid pollution inside of a boat is prevented; further pollution of the air we breathe is prevented; millions of dollars are saved for the cities, State and Fed. Gov. combined and at least $35.00 is saved for motor vehicle owners.

12 Claims, 32 Drawing Figures

INVENTOR.
Peter Andrews

SURFACE, MATERIAL AND HEALTH PROTECTIVE COMBINATION DEVICE

This is a division of application, Ser. No. 288,159 filed June 17, 1963 and now abandoned.

This invention relates substantially to an open topped fluid retaining receptacle device, which is generally for and is separately secured in a hangered means which is removably secured and is suspendingly disposed to and under a motor vehicle which may or is having fluid or oil drip therefrom.

The above disclosed receptacle device having a separate material therein into which the dripping fluid or oil may drip and be substantially retained.

Not one receptacle device that I am aware of have been removably secured under the oil dripping portion of the motor which is in an inboard motor boat or in an inboard-outboard motor boat, to thereby protect an inside portion of the boat from being, polluted, contaminated, slippery, dirty sight, and the like.

A very important object of this receptacle invention is to catch and retain fluid or oil which drips from a motor vehicle especially when the motor vehicle is in a fast forward drive motion, is started, stopped, and curving abruptly. The dripped in fluid is later partially oxidized and thickened in the receptacle by the flow or generated draught of air which is over the retained fluid, especially when said vehicle is in a fast drive motion, and especially when a catalyst means for said fluid, or hydrocarbon consuming bacteria are also in said receptacle and/or a material therein.

The above process of having the draught of air flow over the retained fluid will thereby absorb or drive off the fumes which are or may be thereover the retained fluid, the draught of air will also provide the fluid with oxygen to accelerate the dripped in fluid oxidation and will create a draughty atmosphere through and/or over said retained material. Thereby, volatile acids or fluids are also removed and this in effect reduces the fluid volume and increases the thickening or viscosity of the fluid retained in and thereunder said contained material. This oxidation action reduces maintenance cost, and increases the fluid retaining life of the material retained in the receptacle. also prevent the motor vehicle used surfaces from becoming polluted, contaminated, impaired or prevent a hazardous fluid slippery surface for vehicular travel thereon.

A still yet another important object of this invention is to provide place or imbue a catalytic chemical or a catalyst means for the dripped in fluid into or onto a material retained in the receptacle portion of the device, or place a catalytic chemical bed or a catalyst bed thereon the inside bottom wall of the receptacle.

A still further object of this combination invention is to save money for the state, parking garage owners, cities, towns, federal government and the like by preventing the fluid dripping pollution, contamination, or impairment of the motor vehicle used surfaces.

Another principle object of this combination receptacle invention is to prevent the following safety hazard created by the fluid drippings on motor vehicular traveled surfaces. Moisture, dew, and especially rain or surface water will, when added to the dripping fluid, slippery motor vehicular used surface, actually raise, float or lift a portion of the said slimy dripped fluid onto its surface and thereby tends to spread or float the dripped fluid from the center portion of the motor vehicular traveled surfaces.

An additional principle object of this combination receptacle invention is to provide friendly relations between customers and commercially owned fluid dripping motor vehicles.

Still another further important object of this invention is to save lives and prevent accidents on our highways and the like.

Still another object of this combination receptacle invention is to have an oil or fluid impermeable receptacle which has an integral bezel-like flange, washer or dished top portion having an opening, a hole, holes or a louvered construction in its bezel-like top portion. Said bezel, washer or top may or may not be dished down towards the inside bottom wall portion of said receptacle. Said bezel or top would greatly increase the dripped in fluid retaining capacity when said motor vehicle is in an out-of-level position. Some of these positions are assumed when said vehicle is parked, standing, being transported, jacked up and the like. When said motor vehicle is in an out-of-level position, with said combination device thereon, the fluid retained therein said receptacle portion of the device will have to attain a greater accumulative volume at the bezeled receptacle sides.

And yet another object of this combination invention is to have accelerators or metal catalyst, for said dripped in fluid, therein the receptacle portion of or material retained therein, or to have iron, copper or the like napthenates, in liquid form or to have napthenates in soap, crystal or salt form or the have oleum and the like therein. Any material which is retained in the receptacle may also have the above accelerators or catalyst imbued or placed therein, if desired.

And yet another object of this invention is to provide an integral guard or shield at one forward end, of the shelf-like member, of this combination device in order to substantially prevent, stones, leaves, debris, paper and the like from filling up and/or contaminating the fluid retaining receptacle portion of the combination device.

And still yet another object of this invention is to by having marine mud, marine hydrocarbon utilizing bacteria, soil, soil hydrocarbon utilizing bacteria, soil and oil hydrocarbon utilizing bacteria and the like bacteria which will utilize the hydrocarbons therein said fluid.

A clear support of terms and phrases used in the claims for or antecedent basis are to also be found therein the description of FIGS. from 1 to 32 to the appended drawing and are to be considered as a portion of this remainder of the specification and which also contain descriptive portions to be considered as being contained herein this latter detailed specification description.

The term "Automotive Vehicles" covers a large area and thereby classification into five groups of motor vehicles are here stated. The first class is a motor vehicle which travels on roads streets and the like having 3 or more wheels. The second class is watercraft. The third class is aircraft. The fourth class is trains. The fifth class is monorail cars.

The present receptacle device invention may be more fully understood by consideration of the appended drawings together with the following description.

Figure 1:
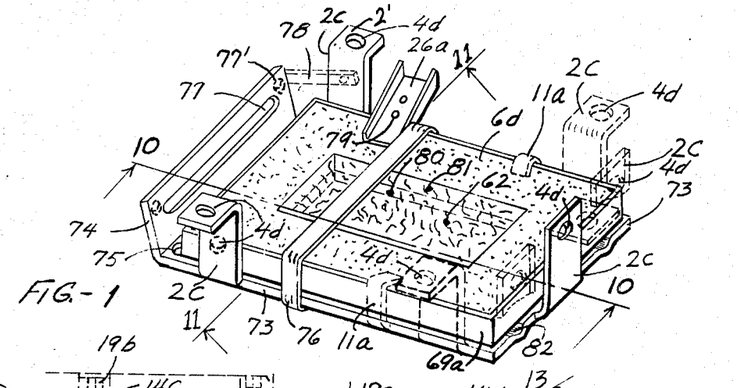
FIG. 1 is an isometric view as seen from above of one embodiment of this present combination invention, which is characterized as being a shelf-like device, basically being rectangular in shape and having thereon a retained and disposable fluid retaining package or receptacle combination device.

FIG. 1 is an embodiment which is entirely different in construction and arrangement from the previous surface, material and health protective devices, in that it is a receptacle device supporting structure means. The shelf-like device is shown as having three hangers 2, two of which have 2' end thereon. The view shows two other hangers 2, in dashed-line outline with 2' ends thereon, that can also be used if desired or if deemed necessary. These latter hangers are generally used when the supporting device is under the crankcase oil pan 15 only, or under the transmission oil pan 39 only. Of course, other situations may become apparent, whereby the hangers 2 may be used other than the ones disclosed, such as to the cross member, frame portion, under the forward portion of the motor vehicle or engine, or be remov-ably secured to the frame, which supports an inboard-outboard motor of an open topped motor boat. The view also shows two hangers 2, in dashed-line outline, that are to be used thereon and be removably adapted or secured to the bell housing 16 and with the accessible housing 16 bolt 19 means. A longer or stronger and longer bolt 19 means or a socket headed bolt 20, which is thereby inserted into the accessible bolt 19, threaded or the like, hole. This latter arrangement is to be considered as using an accessible or available bolt 19 or 20, because the stronger or stronger and longer, socket head bolt 20, and the like can be a replacement thereof the accessible or available bolt 19. Hereafter the accessible bolt 19 or 20 will be referred to as just accessible bolt 19. The two rear plain hangers 2 are considered for use because the bell housing bolt 19 means may be oddly spaced or greater strength or safety may be desired or deemed necessary. The views shows integral (tab 11 for retaining the oil resistant and fluid impermeable receptacle 69, which has material 6, and which is a layered material 80 and 81. Material 80 is an absorbent material such as asbestos, rag or cotton waste and the like. Material 81 is an air filter material and the material 6, in the center opening of material 80 and 81, is an earth material which could have hydrocarbon consuming bacteria, one or a combination thereof as was previously disclosed. The view also shows debris, paper, leaves and the like, shield 74, having an air opening 77 and shield brace 78, in dashed-like outline, if its use is desired or deemed necessary to reduce the shield 74, air flutter thereof, or vibration caused by the forced draughting flow of air which is created by the first vehicle forward drive motion. The view also shows a band, adhesive band or tape, strapping material, or banding material 76. The band is an elastomer material which is oil resistant and at least one thereof is necessary for retaining the receptacle 69 on the shelf 73 portion thereof the device. The strapping and banding material, which is used for lumber, boxes, packages, bundles of cardboard, bundles of paper and the like. The banding and strapping are generally made of flat steel, an oil resistant pressure-sensitive weatherproof tape, avistrap cord strapping having its ends adhesive bonded together, flat fabric, round steel, flat plastic material having a strong cord and the like therein which runs the length of the material, which has an adhesive backing and the like. The view shows material 73 reinforcing groove 82 which is embossed, molded or formed therein for making the self a more rigid member. The openings 75 are surface water weep holes which are therein if desired or deemed necessary. The marks 79 are spot welding marks which designate that the trough-like ear 26 is permanently secured or spot welded to the integral tab 86, as shown in FIG. 4.

Figures 2, 3, 4, 5, 6, 7, 8, 9:
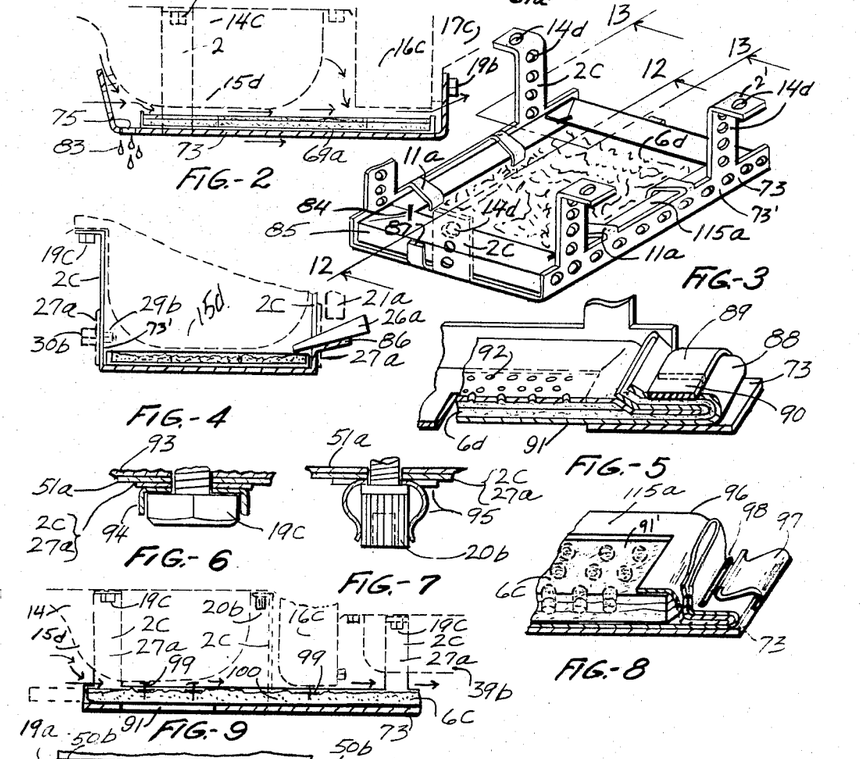
FIG. 2 is a cross sectional view along line 10—10 of FIG. 1, of the receptacle device, shown adapted to the underside of a motor vehicle, showing the flow of air, debris and liquid, slush and the like deflecting member and air flowing space in front of fluid impermeable receptacle.
FIG. 3 is an isometric view of a similar supported bezel-like receptacle device, shown in FIG. 1.
FIG. 4 is a cross sectional view along line 11—11 of FIG. 1.
FIG. 5 is a cross sectional view along line 13—13 of FIG. 3 showing a foamed and laminated material, the ends of which are secured by strapping, taping, or banding means thereon a shelf-like receptacle supporting device.
FIGS. 6 and 7 are cross sectional views of a means for locking a proximate or accessible bolt.
FIG. 8 is a cross sectional view along lines 12—12 of FIG. 3, showing the inner construction of a contained material therein and the outer sleeve-like, fluid impermeable material.
FIG. 9 is a side view of the device in FIG. 3, secured to the underside of a stationary internal combustion motor or engine or a motor vehicle using crankcase and transmission oil pan, accessible bolt means. Also shown are spacers, to provide at least one positive air space between the underside of the crankcase oil pan and the contained and retained material in the receptacle device.
Figure 10:
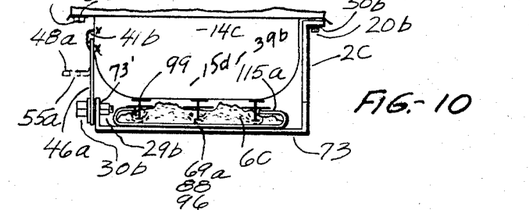
FIG. 10 is a cross section end view of FIGS. 1 or 9, showing how the receptacle device would be presented to the flow of air.
Figure 30:
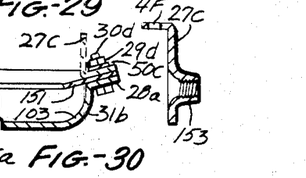
FIG. 30 is another cross section along line 19—19, of FIG. 22, showing a plain outwardly formed flange, which could be indented as in FIG. 29.

FIG. 2 shows hangers 2 are shown removably secured, by accessible bolt 19 means. The two forward hangers 2 could also be eliminated and the shield 74 is thereby removably secured thereto a wall portion of angle 63 or 63' member, shown in FIG. 4 and 10, and any other construction of the angle 63 that was previously disclosed. Bolt means 30 (not shown) could be inserted through the openings 77', shown in dashed-line outline, and into the nut 29. The angle 63 can also have tapped holes or holes with threads therein and as shown in FIG. 30, the protrusion 153 thereof. A nut 29 is not thereby necessary for removably securing the shield 74 to the disclosed angles. The receptacle 69 is a disposable unit with the contained, molded therein and the like material 6, 80, 81, and the like. The receptacle 69 can also be reused and the materials, disclosed as therein, are removed and disposed, whereby a material, which was previously disclosed herein this specification is inserted therein. A material 6, one of which is an open cell foam material can be contained therein and when it became contaminated, with the retained fluid, fluid residue, dirt, dust, and the like, it is removed from the receptacle 69, cleaned and reinserted into the receptacle 69. The inserted material 6 can also be a cleaned material, if so desired or deemed necessary, whereby this phrase, a cleaned material 6, is one which was cleaned at a desired time and stored for reuse as desired. This would create a partial monetary savings, if this is found desirable or worthwhile. The rest of the view is self-explanatory from the previous device, draughting flow of air as shown by the air arrows. Also it is apparent from the disclosures that the shelf-like portion 73, shield 77, hangers 2 and the like are reused. The elastomer band 76 is also reused but the other bands, straps 76 and the like are cut and new ones used. The arrangement and construction of the receptacle device supporting structure shown in FIG. 1 is cheap to mfg., maintenance cost is low, and yet is a strong, sturdy, and safe device when it is adapted thereto the first and second disclosed vehicle. The shelf-like device 73 can be made of a metal material and can be a solid sheet, perforated, expanded, wire mesh, rod construction and the like fluid permeable material. The sheet material is disclosed as solid, whereby it is not fluid permeable. The shelf-like device can also be made of a plastic material, which was disclosed for receptacle 31 as desired or deemed necessary. The hangers 2 can also be as hangers 2 or 27, shown in FIG. 4, 10 or 16, whereby they are a separate member, and can be of a different and stronger material from that of shelf 73, if so desired or deemed necessary for creating a safer and stronger receptacle supporting device. The hangers 2 can also be generally a formed over tee-shaped form in their upper free ends if so desired or deemed necessary for a safe secured hanger 2' end and for convenience of securing and removal, and the like. The receptacle 69 also helps to stiffen the shelf 73 when it is retained thereon and thereto. The holes 77' can also be slots, whereby pins, studs, integral tabs or ears and the like, of angle 48a of FIG. 10, are hooked into the holes or slots 77' and the device is swung upwards so that the rear hanger or hangers 2 can be removably secured to the bell housing 16 or transmission 17 by using an accessible bolt or bolts 19. This arrangement and construction makes it possible to removably secure the device to the first vehicle by using only one bolt 19, and if a snap-slide fastener were secured to the vehicle then no bolts 19 or tool would be used.

FIG. 3 shows that the shelf-like device has a channel-like shelf 73, integral hangers 2, of which three or four are used as desired, and are removably secured as previously disclosed. The hangers 2 are shown with perforated openings 14, which the perforated material has throughout its perforated sheet, but of which the device as shown 73 is made. The view shows receptacle 85 retaining tabs 11, which are integral with the upstanding shelf sides 73: The tabs 11 are finger or tool manipulated or the banding, strapping, band and the like, disclosed receptacle retaining means as in FIG. 1 is used if desired. The view shows the removable and disposable receptacle 85, which is made of an oil resistant and fluid impermeable material and having contained in a material 6, which is also disposable therewith the receptacle 85. The device 73, is to also be made from a, metal, plastic, and the like material as disclosed in FIG. 1 or a woven or non-woven fabric material or a wood by product material which is saturated with a material or resin, whereby it is fairly rigid, hard and oil resistant and the hangers 2 are of a stronger and different material, whereby a safer hanger means is achieved and the hanger material cannot easily be crushed by the heads of accessible bolt 19 or 20, and the supplied bolt 30 and nut 29, when secured as shown in FIG. 4. A large flat metal washer can also be used if necessary with the bolts and nuts to prevent the crushing action. The view shows paper or cardboard staples 84, integral tab 87, a surrounding, integral, bezel 115 of the receptacle 85. The rear (numbered) tab 87 can be eliminated, if the rear single, plain ended hanger 2 is used. The forward tab 87 (not numbered) is also eliminated, if the tabs 11 are made and used for biting or digging its tip into the material 6 or bezel 115 or if the banding, strapping, and the like are used. The receptacle 85 can also be adhesively bonded to the sides or center flat portion of the cannel-like shelf 73. The openings 14, in the upstanding portion of hangers 2 can also be used for inserting an accessible bolt 19 or a supplied bolt 30 and the like, whereby a greater versatile hanger and adapting means is possible. The rear plain hanger 2 may have to have a larger opening in for accepting a large accessible bolt 19 means, such as from the transmission 17 and the like. The receptacle 85 could also be removed and inserted into and onto the shelf-like device 73, as a drawer is removed and inserted into a desk and the like. The tabs 11 would not have the biting or digging in curved ends and would thereby retain the receptacle 85 down, as do upper drawer guides or desk tops to maintain a spaced relation between the crankcase oil pan 15 and the like and the top of the receptacle 85. The forward tab 87 is finger bent upwards, against the forward portion of receptacle 85, to prevent its sliding out when the vehicle stops abruptly. An opening 91 shown in FIG. 5 and 9 is in and through the substantially flat bottom portion of the shelf-like receptacle supporting device 73, if desired, for reaching through, after the receptacle 85 is partially, as is generally shown by the dashed-line outline in FIG. 9, or completely slid out, and removing the crankcase oil pan 15 drain plug and the like, for changing or removing oil therefrom. The hangers 2 accessible bolt 19 means are thereby not disturbed and no tools are necessary for inserting or removing the receptacle 85, whereby the oil may also be changed, if necessary. Adhesive means may also be used, if desired or deemed necessary and thereby tabs 11 and 87 would not be necessary and uncementing could be accomplished by using a solvent for releasing the adhesive means. Human finger or tool pressure or heating of the shelf 73 with a lamp, torch and the like means could also be used if necessary for releasing of receptacle 85, to permit its being slid out. The tabs 87 may thereby be used if desired or deemed necessary.

Figures 22, 23, 24, 25, 26, 27, 28, 29:
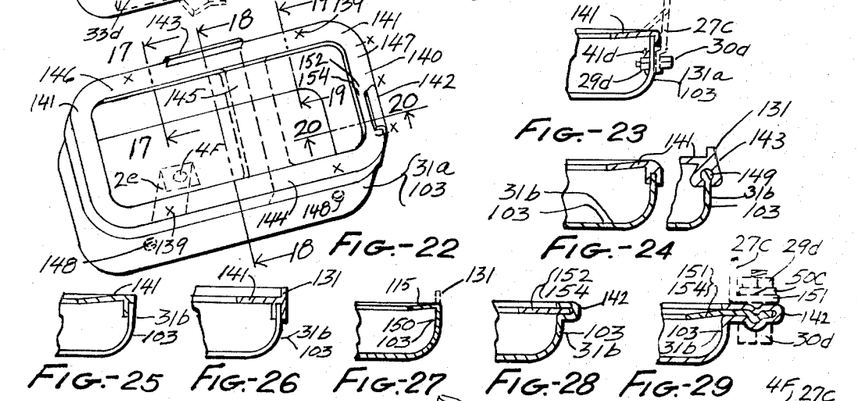
FIG. 22 is an isometric view of a bezeled, flanged, washered, molded and the like, fluid impermeable pan or receptacle.
FIG. 23 is a cross section along line 17—17 of FIG. 22 showing an outside flanged bezel-like member which is secured to and surroundingly on the top of the pan or receptacle side wall.
FIG. 24 is a cross section, along line 18—18 of FIG. 22, showing another bezel-like member, as described in FIG. 23.
FIG. 25 is a cross section, along line 19—19 of FIG. 22, of an inside flanged bezel-like member.
FIG. 26 is a cross section, along line 18—18 of FIG. 22, and is substantially the same as described in FIG. 24.
FIG. 27 is a cross section, along line 19—19, of an integrally, inwardly flanged, bezel-like pan or receptacle device.
FIG. 28 is a cross section, along line 20—20 of FIG. 22, showing a fragmentary portion of an outer portion of a washer-like member, which acts as a bezel-like member for the pan or receptacle device.
FIG. 29 is another cross section along line 20—20, of FIG. 22, showing a downwardly beveled washer which is indented.

FIG. 4 shows the hanger 2 being removably secured to the crankcase oil pan 15 flange, with accessible bolt 19. Hanger 27 is removably secured thereabove as is hanger 2 but hanger 27 is removably secured, by bolt 30 and nut 29 to the upstanding, recti-linear, side 73' portion of the shelf-like receptacle supporting device 73. The nut 29 could be permanently secured to the inside of the side 73' if desired or deemed necessary. The upper end 2' of hanger 27, could also be as the hanger 52 is shown in FIG. 25, with ear or wings 53 or 53 and 54 if desired or deemed necessary, for a more secure and safer hanger 27 securing means. Two of the forward bolts 30 would thereby be either untouched, because the self locking nut 29 would allow the forward portion of the device to swing downward and pivot on the body of the bolt 27, which was only snugly tightened against the outside portion of hanger 27, thereby, only one or two rear accessible bolt or bolts 19 need be completely removed for swinging the shelf portion 73, of the device, downwards. The receptacle 85 can thereby be removed, disposed, and another new or cleaned receptacle 85, is replaced in and the device 73, is again removably secured to the first vehicle. The receptacle 31 could also be operated as a swinging receptacle if desired, the hangers 27 would have to be located on the outside of the receptacle 31 and also be straight or curved sided, whereby the latter could create a possible detent action thereon the top edge of receptacle 31. The bracket 32 would also have to be eliminated. The hanger bolts 30 can be loosened for the swinging operation and then tightened securely or the bolts 29 can all be removed before the receptacle 85 can be removed if so desired or deemed necessary.

FIG. 5 the device 73, having integral upstanding sides 73' and extending upwardly therefrom is a portion of a hanger 2. The view shows a, banding or strapping 89 and 90, device 73, opening 91 shown the bottom wall of device 73, in the top portion of the oil resistant and fluid impermeable skin or sleeve 88, which is around an open cell, urethane, polyester and the like, foam material, glass wool, rock wool and the like material 6. The sleeve 88 and material 6, which can be all one material of a single density or a layered material, whereby the lower layer having a greater density, are made together as is insulation material for homes and the like. The sleeve material 88 with the material 6 is cut to length, with a perforated 92 area, which is formed downwardly to permit fluid which drips from the first vehicle to flow into the center, and through the perforations 92, and into the material 6. Even with a catalyst for the retained fluid therein, or hydrocarbon consuming bacteria therein, and the like, used towards increasing the rate of oxidation and thickening of the retained fluid in the material 6. The ends of the sleeve are folded over, as shown, with the material 6 compressed therein, and with the open ends being even or slightly above the center of opening 91, whereby the retained fluid is held capture in the sleeve, without cementing, heat sealing, and the like of the foil or thermoplastic material 88. The sleeve 88, which could be a, flame treated, polyethylene skin and the open cell, urethane, flexible foam material 6, is foamed and laminated in one pass and no bonding agents are used for the urethane formation acts as its own adhesive.

FIG. 6 and 7 shows the bolt 19 which is an accessible bolt means and 20 is a supplied replacement of bolt 19 or is also an accessible first and second vehicle accessible or available bolt means, both of which were previously disclosed. The bolt head, lugged 94 washer is for positively locking the bolt head 19 from any accidental loosening or rotation thereof. The bolt 19 is tightened into its threaded hole (not shown) and then the lugs 94 are bent down over the heads of the bolt 19. The allen or socket head bolt 20 has a spring pronged washer, whereby the prongs or fingers 95 are detented into the knurl of the socket head bolt 20, whereby it is also prevented from accidental loosening and acts like a lock washer. Note the hanger portion 2 and 27 and the crankcase 14 flange 51 and gasket material 93 all compressed by the head of the bolts 19 and 20.

FIG. 8 shows the oil resistant and fluid impermeable sleeve 96 is folded as shown or are sealed and folded over. Sleeve 96 can be made of a foil material such as copper, aluminum and the like or can be an oil resistant elastomer material, or a plastic oil resistant and fluid impermeable material. The material 96 can be in the form of a bag, with one end sealed or cemented against retained fluid leakage thereout, and the other end open and folded over, as shown, or also sealed but both ends of the bag material 96 is folded over and held or retained by the wire strapping means 98 or the formed over clip 97 means which is an integral or separate member of said device 73. Both ends of the sleeve 96 can be sealed, cemented and the like, if desired or deemed necessary and folded over also if desired for having a material thickness to clamp or band over. The opening 91' is in the material 96 and has a surrounding bezel-like member 115 therearound. The material 6 is a stratum layered material having a variable degree of density per layer, or a sandwiched layer of materials with a variable degree of density per layer, or an open cell foam material having large open topped cavities therein for creating a greater draught of air through the material 6. Earth can also be placed therein the large cavities for absorbing the retained fluid therein. Catalyst for the retained fluid can also be placed in the cavities if desired. The earth, having hydrocarbon consuming bacteria could also be contained in the large cavities if desired. Material 96 is to be made of the same material as was disclosed for material 88.

FIG. 9 shows the bolt 19 and 20 means is shown as removably securing the hangers 2 or 27 to the crankcase 14, and to the transmission oil pan 39 and thereby suspendingly disposing the receptacle supporting device 73 under and in spaced relation thereto. The device 73 is also under the bell housing 16. The flow of draughting air is shown by the arrows. Also shown is material 6, shouldered and headed, hold down members 99. The dashed-line outline of hanger 2 shows how the device 73 could be under the bell housing and a portion of the transmission oil pan 39 only if desired or deemed necessary.

FIG. 10 shows how hangers 2 are removably secured thereto the crankcase oil pan 15 flange 50 with the bolts 19 or 20. It also shows the material 6, headed hold down members 99 which keep the material 6, when it is of a fluffy nature, and thereby a spaced relation is provided between the underside portion of crankcase oil pan sump 15 and or bell housing 16 (shown in FIG. 9). The material 6 as shown could also be glass wool, rock wool and the like which is quite fluffy and member 99 is thereby necessary, even though glass wool is quite permeable by said fluid. The view shows bracket 48 welded 41 to the side of the crankcase 14, whereby hanger 2 or 27 can be removably secured to as desired or deemed necessary. The strap or hanger 46 is also shown as being permanently secured or welded thereto the side of crankcase oil pan 15 and is removably secured or secured with the bolt 30 and nut 29 in as many places as desired or deemed necessary and or as shown in FIG. 10. The material hold down members 99 also provide a spaced relation between the crankcase oil pan 15 and the material 6, whereby the lubricating oil, in the crankcase oil pan 15, is not overheated because a draught of air is also there against the bottom portion of the crankcase oil pan sump 15 to prevent the temperature increase of the lubricating oil. This rise in temperature would increase, the rate of oxidation and the thickening and/or acid conditions therein the lubricating oil.

Figure 11:
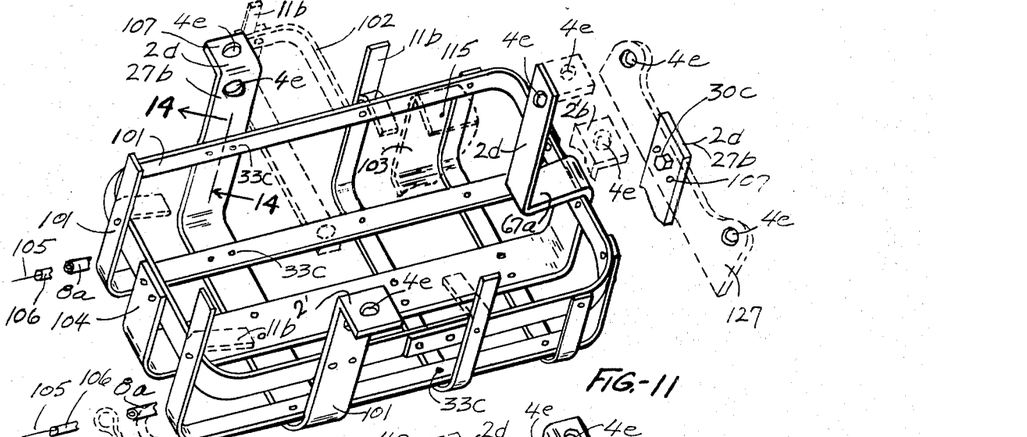
FIG. 11 is an isometric view as seen from above, of a polygonal shaped, basket or crate structure into which a removable receptacle device may be nested. The view also shows various ways in which the single, upright hanger can be formed for removably securing means.
Figures 12, 17:
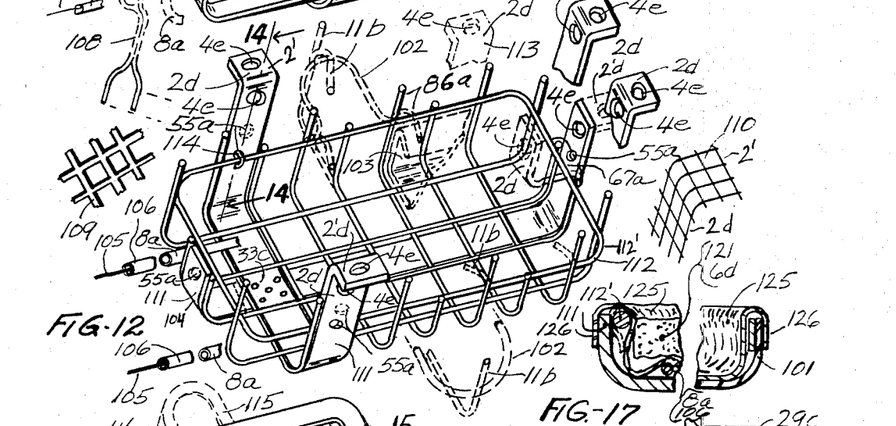
FIG. 12 is an isometric view, as seen from above, or a crossed hangered support means and having thereon a polygonal shaped air permeable, basket, or receptacle.
FIG. 17 shows a cross sectional view of a package having an outside layer which is fluid impermeable and formed over the upper portion of the polygonal shaped structures of FIGS. 11 and 12.
Figures 13, 14, 15, 16:
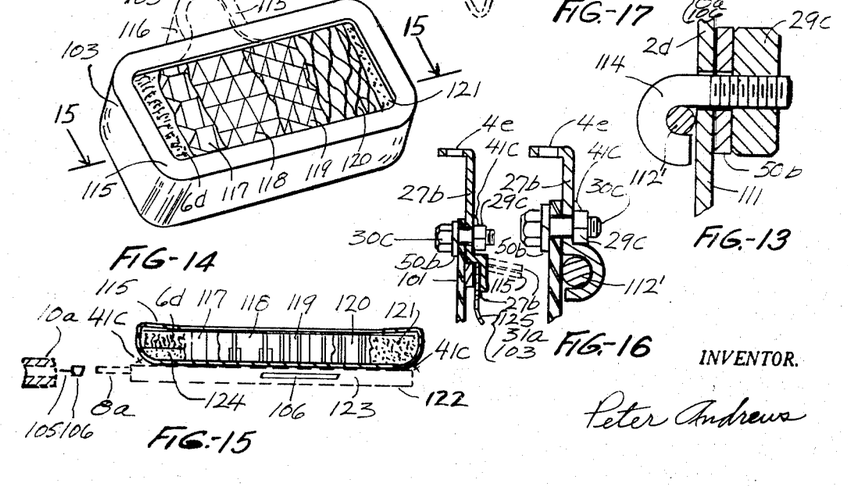
FIG. 13 is a cross sectional view along line 14—14 of FIG. 12, showing one of various means for removably securing the fluid permeable receptacle or basket to the extending upright cross members, which are the hangers or legs.
FIG. 14 is an isometric view, as seen from above, or a fluid impermeable bezel-like receptacle device 103, having material contained therein.
FIG. 15 is a cross sectional view along line 15—15 of FIG. 14, showing various structures and materials, which can be used therein the bezel-like receptacle device.
FIG. 16 shows alternate structures along lines 14—14 of FIG. 11 and 12, showing how the upright hanger members could be removably secured, not shown in FIG. 11 or 12, along line 14—14.

FIG. 11 shows embodiment of a receptacle supporting device structure, such as a crate, basket, and the like, which is herein considered as a fluid permeable receptacle, because fluid cannot be retained therein. This arrangement and structure is ruggedly constructed, where rough usage is encountered or a safe, solid, basket or crate construction is desired or deemed necessary. An oil resistant and fluid impermeable, lining, skin, film, sheet and the like material and having all the sides thereof upstanding to thereby form a fluid retaining receptacle substantially as shown in FIG. 16 and 17 wherein two of the many known ways are shown. The view shows the rear hanger 2 which has the receptacle 101 stand off formed portion 67. The view shows in dashed-line outline the hanger end 2' and a plain ended hanger 2, which is spot welded or pinned 107 and or removably secured to a cross member 127. The cross member 127 has two openings 4 through which accessible bolt 19 (not shown) means of the bell housing are inserted for removably securing the cross member 127 to the bell housing 16 (not shown). The rear hanger 2 or the cross member 127 can be removably secured to the forward or rear accessible portion of the bell housing 16 as desired or deemed necessary.

The term, "permanently secured," as here used, is to mean any means such as welding, brazing, spot welding, hard soldering, riveting, cemented, soft solder, heat sealed, and the like, whereby the joint or union of the members are considered as permanent. The term, "removably securing," is to imply or mean that the joint or union of the members is removable or separated by using tools or human means, and that heat, solvents tearing apart, cutting thereof and the like, are not used.

The supporting structure hangers 2 or ends 2' or cross member 127 are to also have slotted, keyhole or tee-slot openings as desired or deemed necessary. The view shows the various slats as being spot welded 33, but if the crate or basket 101 is made from a plastic material, wood or a wood byproduct material, a woven or non-woven material that is impregnated with an oil resistant resin, a reinforced plastic material and the like, as is disclosed for making of receptacle 31, and is thereby cemented, riveted, and the like. The receptacle 68, shelf device 101, crate or basket 101, cross member 111, and the like can be made from a metal which has a plastic coating on a portion thereof or all over as desired or deemed necessary for corrosion prevention and colorful appearance.

Paint, chrome and like coatings can also be used if desired or deemed necessary.

The wet lay-up process or the use of prepregs can be used for making the above disclosed receptacles, crate and basket receptacles and the like. The latter prepreg, which could be a glass fabric preimpregnated with a resin which is partially cured to a "B" state such as polyester-glass prepreg material which is laminated and cured together in plies as desired or deemed necessary. The prepregs can be made with heat resistant phenolic resin, of diallyl phthalate resin and glass, of polyester resin having a glass content and the like which is obvious to persons skilled in the art.

The view of FIG. 11 shows the crate or basket 101 which could be molded, in one integral piece, from a plastic material as are clothes baskets and the like, and the hangers 2 can have, reinforcing means therein for added strength if desired or deemed necessary. The tab ends 11 are finger manipulated over as desired or heat can be used for straightening and forming them over, if they are made of a plastic material which is thereby heat formable. The 102 portion shown in dashed-line outline, is an integral or a separate basket ear for nestingly receiving an ear thereof the dashed-line, bezeled 115, nestable receptacle 103, as more fully shown in FIG. 14. The hanger ends 2' can also has a wing or wings thereon if desired.

FIG. 12 shows that the cross-membered 111, can support and have receptacle device 31, 85, 103, 150 and the like, and be directly supported thereon if desired or deemed necessary, substantially as is shown in FIGS. 1-10 having shelf-like means 73 receptacle, for example 31, 69, 85, 96, 103 or 150, supporting structure. whereby a cheaper construction is thereby achieved. The basket receptacle 112 being, for example, a supporting structure which is removably secured to the supporting structure hanger 2, by the hooked bolt 114 which has a threaded end on its straight portion. Shown in FIG. 13 is an enlarged view, whereby a lock washer 50, and a nut 29 for the bolt 114 is threaded on and tightened so that the upper wire or rod 112' of basket 112 is held captive and tight so that rattling thereof is eliminated. The bolt 114 is thereon all three hanger 2 members if so desired but could be eliminated from the third single hanger 2 shown in curved 67 and upstanding dashed-line outline, whereby the rear of basket receptacle 112 is forced under the formed-over portion 67 and thereby partially wedges it thereunder, to prevent any shake or rattle between the basket and hanger portion 67. The rear hanger 2 or rear hangers 2 can all be plain ended or have hanger ends 2' thereon, as shown, for the opening 4 can be used as desired for receiving accessible bolt 19 means or a bolt 30 if necessary with the cross member 127. The cross member 127 can also be used with the single rear hanger 2 if desired or deemed necessary, as disclosed in FIG. 11. The two partially drawn hangers 2 having ends 2' would have a hanger 2 upstanding portion and an integral portion thereof, extending to the other cross member, as is the, single, center horizontal member. The cross members are shown to be permanently secured in an overlapping construction. Shown is tubing 8, electrical heating means 105 and sheath 106. Shown are the integral wire or rod ends 11 in an upstanding and bent over for fro retaining the dashed-line receptacle 103 in a captive position. The ends 11 can be finger or tool manipulated as desired or deemed necessary. The forward curved up portion 104 can be straight out or completely eliminated from the cross member. This would allow the removal of the receptacle 112 by simply removing or loosening and swinging around the bolt 114. The receptacle 112 can thereby be slid forward without removing or touching the accessible bolts 19 or 30 as the case may be.

The receptacle means supporting structure cross hangers 111 can also be completely eliminated to thereby still maker a cheaper construction. The basket can thereby be a receptacle receiving device all by itself, whereby the receptacle portion of it is 112, which may receive a fluid drip catcher receptacle means 31, 69, 85, 96, 103, or 150 and the like shown in FIGS. 1-2, 8, 11, 14, 24-28 and the integral hanger 110 is shown with a hanger end 2' thereon. There would thereby be a polygonal shaped, air and fluid permeable receptacle 112 which has upstanding, surrounding, sides which integrally are connected on the top portion, by a wire or rod 112'. At least three of the integral hangers 110 extend upwardly unless it is constructed as in FIG. 20 and have a plain end or a formed over end 2' thereon. Accessible bolt means are inserted through a mesh opening for removably adapting the basket device 112 receptacle means supporting structure to a portion or portions of the first vehicle and second vehicle as desired or deemed necessary. A material, as disclosed in FIG. 11, whereby it is placed or nestingly contained therein for creating a receptacle 103 or 125 which will retain the fluid 42 which leaks from the first or second vehicle and into the, just formed, receptacle 103 or 125. A pre-formed or pre-shaped receptacle 31, 69, 85, 96, 103, 125, or 150 as shown in FIGS. 1-10 and 14, 15, 24-32, can also be nestingly contained therein the supporting structure means as desired or deemed necessary. When and if the mesh of receptacle 112 is above one half inch openings and up to 2 inch or more, then the integral hangers 108 would be formed, as shown, in the dashed-line, upper hanger, outline. The formed over end 2', shown in a circular loop form, is for inserting through an accessible bolt 19 means. There would be at least three of the hangers 108 and one of them can be plain ended, whereby the looped opening would be in the upstanding portion of the hanger 108. Of course when four hangers 108 or 110 are on the receptacle 112, then the rear ones are to be plain ended or 2' ended. This would depend on where the hangers are to be mounted or removably secured, such as to the bell housing, transmission, or transmission oil pan. Wire, strapping, banding and the like means can also be used for securing the receptacle 31, 85, 103 and the like, previously disclosed herein, under and to a forward frame cross member supporting structure if desired or deemed necessary for capturing fluid which leaks from and into the disclosed receptacles. The meshed hanger 110 can also be wide enough for accepting two or more accessible crankcase 14 bolts 19 through its meshed openings. Also zero, one, or two of the ears 102 can be on the receptacle 112 as desired or deemed necessary. A perforated 109 material can also be used if desired. An expanded metal material can also be used if desired. Shown is another cross member 113, in dashed-line outline, and hanger 2 thereon with an end 2'. The latter supporting structure construction would thereby be two U-shaped hangers 111 and 113 which would act as saddle supports the fluid or oil impermeable receptacle devices 69, 96 of FIGS. 1, 10 and receptacle devices 31, 85, 103, 150, and the like. A connecting cross member could be permanently secured 33 there to the bottom portion of the saddle supports 111 and 113 if desired or deemed necessary.

FIG. 13 shows the hooked bolt 114 cannot rotate, when the nut 29 is tightened for securely clamping the wire or rod 112' to the hanger 2.

FIG. 14 shows a polygonal, bezel-like, shaped oil resistant and fluid impermeable receptacle 103. The receptacle 103 and the like can have square corners, round corners or be rectangular, oval oblong, polygonal configurated, oval and even flat round if desired or deemed necessary. The view shows in dashed-line outline an integral ear 116 thereon a side of receptacle 103 if it is desired to be used and so construct receptacle 103. The dashed line ear 116 may, also has a bezel 115 thereon. The view shows a surrounding, inwardly formed bezel-like flange 115 on the receptacle 103. The previously disclosed material 6, 117, 118, 119, 120 and 121 may be contained in bezel-like the receptacle device 103 as desired or deemed necessary. One of the materials, retained in the receptacle 103 is actually foamed inside of bezel-like the receptacle 103 and thereby is substantially an integral part of the receptacle 103. This is because the open cell foam formation acts as its own adhesive and bonds itself to the inside of the receptacle 103 material if so desired. The view shows some of the disclosed materials which material 6 represents. A honeycombed open ended and substantially upstanding material 117 which is hexagonal shaped, an interlocked partition construction as used for chicken egg separators 118, a square honeycomb shaped material 119, a wave form configuration, wrinkled, corrugated, crimped, ruffled, and the like material 120 which can be tissue paper, paper toweling, facial tissue paper, cardboard, crepe paper, plastic sheet, metal foil, and a metal material. The material 120 which may also be soil or earth which has a catalyst for the retained fluid therein, or has hydrocarbon consuming bacteria, mold, and the like. The bacteria can be naturally therein, inoculated therein, or placed therein a desired or deemed necessary. A carpet material, which is one of the materials 6, is here numbered as 6 and is a carpet or plush material having piles which are considered as upstanding as in a rug material or plush material.

FIG. 15 shows to tubing 8, sheath material 106 and resistance wire 105 which is located and housed in the sheath 106. Shown also is a tubing or pipe 10. The member 122 is a flat shaped, hollow heated, air or exhaust gas chamber, which is used for heating the receptacle 103 bottom wall portion, whereby the retained fluid in the receptacle 103 is heated to a higher temperature and thereby the rate of oxidation and thickening of the retained fluid is increased, and also the disclosed bacteria, if therein, make use of the heat. The heating chamber 122 can be contained in the receptacle 101 or 112. The shelf-like device 73 being a receptacle device supporting structure can also have the chamber 122 supported thereon and receptacle 85 can also be resting thereon, for absorbing heat therefrom the chamber 122 and thereby heating the retained fluid therein the receptacle 85 to a higher temperature to and increase its rate of oxidation.

FIG. 16 shows the cross member 101 which has an opening 55, as shown in FIG. 12, through which a portion of a bolt 30 is inserted for removably securing the hanger to the cross member 101 which is now shorter and terminates just above the opening 55. The left side of FIG. 16 shows the bolt 30, lock washer 50, nut 29 which is welded 41 to the hanger 27, an offset portion of hanger 27 which captively retains the receptacle 31 or 103 and which has no bezel thereon, or 125 which also has no bezel thereon. The hanger 27 lower portion thereof is shown in dashed-line outline as 27 and thereby captively retains the bezel-like 115 receptacle 103 or 125 as also shown in dashed-line outline. The hanger 27 can also have the hanger wing 53 or 53 and 54 as desired. The hanger 27 thereby suspendingly disposes the crate or basket 101 under the first and second vehicle and also retains the disclosed receptacles, 31, 103, or 125 in the basket or crate 101. It should also be noted how the hanger 27 shoulder is abutted against the upper flat member of receptacle 101 to prevent its rotation on the bolt 30 body portion. The right side of FIG. 16 is similar to the left view thereof. Shown is bolt 30, nut 29, welding 41 of the nut 29 and clamping the wire 112' of the receptacle 112, with the hanger 27 means.

FIG. 17 shows cross members 111, and basket receptacle 112, receptacle device supporting structure tubing 8, or sheath 106 if the electrical heating unit is used, material 6 or material 121 as partially disclosed previously in FIG. 15. The view shows metal foil material 125 and how it is formed after it has been finger manipulated over the receptacle 112 and over the short forward portion of cross member 111. It also shows how the foil 125 is looped, in dashed-line outline, over wire or rod 112'. The right sided view shows the crate or basket 101, foil material 125, which is generally from 0.003 to 0.010 (thousands of an inch) in thickness but without tubing 8, sheath 106 or material 6 if so desired or deemed necessary. The plastic, preformed material 126, would have to have some opening in the top curved portion, to clear the hangers 2 and 27 and the tabs 11, shown in FIG. 11. The material 126 would also be characterized as being at least oil resistant and/or fluid impermeable.

Figures 18, 19, 20, 21:
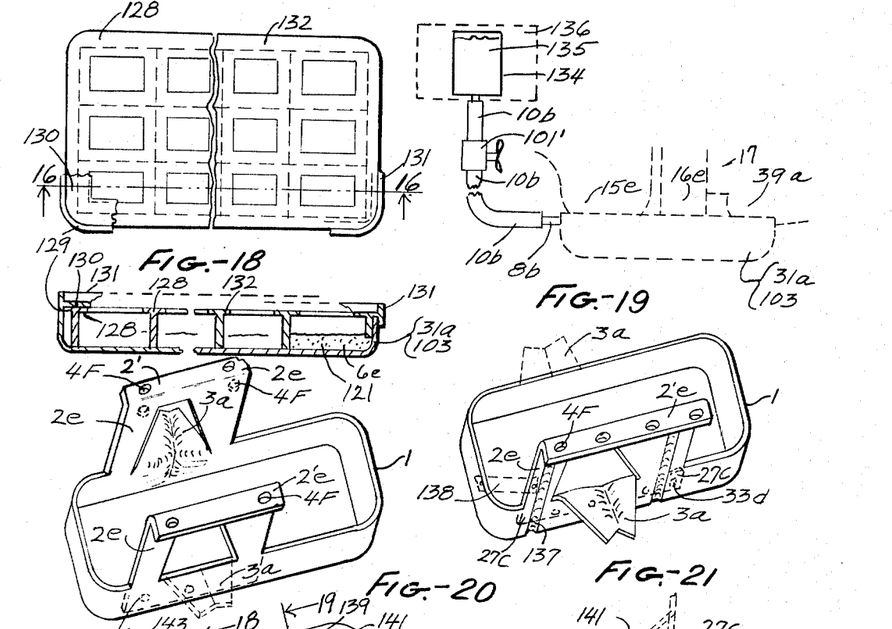
FIG. 18 shows a top view of a compartmented or honeycombed material having a flanged upper portion and also shows a cross-sectional view along line 16—16.
FIG. 19 is a side view of a bottle of napthnate or liquid catalyst, which is piped and valved down to into the fluid retaining pan or receptacle device under the motor vehicle.
FIG. 20 is an isometric view of an integral, one piece, two hangered pan or receptacle device 1.
FIG. 21 is an isometric view of an integral, one piece, surface or material protective device 1 having only one leg or hanger.

FIG. 18 shows a partitioned or separator type of material which has a grid-like bezeled top 128 and 132. The left portion of the view shows the partitioned and divided material 128 as being retained in the bezel-like 130 receptacle 129 which also has an integral upstanding and surrounding rim around the integral bezel 130. The upstanding lip 131 prevents the leaking fluid, which may drip onto the bezel 130, from possibly flowing over the side of the receptacle 129 and thereby leak thereonto the first class motor vehicle traveled surface or parked surface below or on the bottom wall portion of the second class of motor vehicle. The bezel 130 and the partitions and bezel 128 portions prevent the retained fluid from spilling or flowing out of the receptacle 129 when the first and second vehicle is, out of level, or in a strong inclined or reclined angle, or the forward drive of the first and second vehicle is in a curving drive motion whereby centrifugal force acts on the retained fluid, or the first class vehicle is abruptly stopped or abruptly started and the like. The flow of draughting air currents also will be forced thereinto and thereby creating a turbulent air current over and against the receptacle retained fluid. The draughting flow of air thereover also acts, suckingly, on the partitioned compartments and draws the turbulent air back out and back into the draughting atmosphere behind the first vehicle. The retained fluid is thereby supplied with atmospheric oxygen and dehydrates and carrier off fumes, vapors and the like, which are above the retained fluid. The bottom portion of the partitions or separators are to have sawtooth tips for the retained fluid flow thereunder and for creating a uniform wetting or absorption into the material of member 129. The partitioned member 129 and 132 can be an absorbent material, an air filter material which is oil resistant and is air and fluid permeable, a glass fabric-plastic material which is glass cloth and is impregnated with a resin of polyester, phenolic, epoxy or silicon and the like to a desired thickness and strength. The member 129 and 132 can also be made of paper which is impregnated with a phenolic of the previously disclosed resin for adding strength and rigidity, as well as moisture and oil resistance. The member can also be made of metal, plastic and the like which is preferred to be an oil resistant material.

The right side of FIG. 18 shows the partitioned member 132, with the upstanding rib 131 and how the channel or groove which is continuous and surrounding in the member 132. The channel (not numbered) fits over the top edge of the receptacle 103 (when a bezel member is not thereon) for creating and integral, one piece, compartmented receptacle which can be used on the shelf-like device 73, contained in crate 101 or basket 112 or on the cross members 111, or in the saddle-like structure which is created by two of the U-shaped members 111 as shown in FIG. 12. The channel thereon the 103 receptacle can be heat sealed, cementingly sealed and the like, to create a fluid impermeable integral joint if so desired or deemed necessary. The material 6, 121 or a catalyst for the retained fluid to also be contained in the compartments if desired, or deemed necessary. The lower portion of the partition wall members can also be cemented or heat sealed to the inside bottom wall of the receptacle 31 and/or 103 if desired or deemed necessary for adding rigidity to the unit as shown in FIG. 18.

FIG. 19 shows a bracket wall or a wall member 136 of the first class vehicle. A fluid container 134 in which a napthnate or other fluid catalyst 135 is contained therein. A tubing or pipe 10 is connected to a snout or on the neck of the container 134 and the other end of tubing 10 is connected to a valve 101'. Another length of tubing 10 is connected to the valve 101' and to one end of tubing 8. The other end of tubing 8 is contained in receptacle 31 or 103 and is open ended, for flow of the catalyst, water, or any liquid which will reduce the consistency of at least the retained dripped-in fluid. The tubing 8 can also have openings in its wall portion to facilitate the flow of the disclosed fluid thereout and into the receptacle 31 or 103. The fluid 135 can also be a degradation product such as water, some of the lower carboxylic acids, and the like liquids. The valve 101' is opened manually, or mechanically, to allow some of the fluid 135 to flow into the receptacle 31 or 103 and the like used herein this invention. The disclosed receptacle is shown, in dashed-line outline, under the crankcase oil pan 15, bell housing 16, transmission 17 and transmission oil pan 39.

The supporting structure, for the disclosed receptacles, is not shown, but it can dispose the disclosed receptacles under one portion, or under any combination of the disclosed first class vehicle portions as desired or deemed necessary for retaining the fluid which drips therein the above disclosed vehicles.

FIGS. 20 and 21 were shows a two-hangered device which will suspendingly dispose the receptacle 1 under the crankcase oil pan 15 and under the bell housing 16 and partially past if desired and when the hangers 2 having ends 2' thereon which are removably secured to the crankcase 14 flange by using the accessible crankcase 14 bolts 19. The ear 3 may be shown as being integrally formed and drawn from the upstanding portion of hanger 2, if so desired. The various openings disclosed in FIG. 1 can be in the upstanding portion of hanger 2 or in the hanger end 2' as shown in that figure. In FIG. 20, a lower portion of hanger 2 is shown in dashed-line outline, whereby hanger 2 is a separate member and is permanently secured inside the receptacle 1 and to the side portion of receptacle 31. The spot welding mark 33 is shown. The ear 3 need not be on the device if so desired or deemed necessary. The hanger ends 2' could also be removably secured to a transmission oil pan 39 flange by using the accessible bolt 19 means thereof, whereby the receptacle 1 would extend under the bell housing 16 but not under the whole crankcase oil pan 15. The receptacle 1 can also be shorter and thereby would not be disposed under the bell housing 16 with this construction.

FIG. 21 shows to the device with only one hanger 2 supporting structure on the receptacle 1. The ear 3 is for catching fluid which drips out of the crankcase breather pipe 21 as shown in FIG. 2. The upstanding hanger 2 portion is shown having embossed grooves 137 which provide more rigidity or stiffness to the upstanding hanger portion. A side angle member 138 can be thereon if desired or deemed necessary to prevent bending of the hanger 2 at the top of the receptacle 1 for hanger 2 is the weakest at this portion thereof. The hanger 2 can also be a separate member, thereby the receptacle 1 would be receptacle 31 if so desired, and as disclosed in FIG. 20 for hanger 2. The spot welding marks 33 are also shown herein FIG. 21. Also shown is number 27 to designate a separate or removable hanger 27. The openings 4 are also to be in hanger 2 or in hanger 2' end if desired or deemed necessary. The hangered device can be removably secured to the crankcase 14 flange or to the transmission oil pan 39 flange, as was disclosed for the device in FIG. 20, whereby a portion of the receptacle 1 is disposed under the bell housing 16. The ear 3 may also be eliminated if desired. The bell housing 16 may be too far to reach in some cases, whereby a separate, single receptacle would have to be disposed under only as in FIG. 21, of the previously disclosed divisional, if desired or deemed necessary. The ear 3 can also be eliminated from the FIG. 21 device if so desired.

FIG. 22 shows a receptacle 31 and/or 103 therewith a surrounding secured bezel-like member 141; integral bezel 115 shown in FIG. 60; a flat-like, washer-like bezel 152 which is oil resistant and fluid impermeable or washer 154 which is oil resistant, fluid impermeable and is made of a metal material; outwardly lipped and flanged 142 portion; dished down washer 151 or a flat-like washer 154 as disclosed previously. The FIG. 22 also shows a partial bezel member 144 which abuts against the other partial bezel 146. The dashed-line cross support 145 would strengthen the sides of the receptacle 31 or 103 from bulging out sideways, especially if hangers 27, as shown in FIG. 23 or 29, are used. The "x" marks 139 represent where an opening could be therein the flange, for supporting structure hanger 27, as shown in FIG. 29. The pan or receptacle can be coated with a material which in effect makes the pan or receptacle fluid impermeable. Supporting structure in the form of legs or hangers, integral or removably constructed, can be on said device, as deemed necessary or desirable at one or more "x" marked points thereon. The said bezel can be joined to the side of the pan or receptacle by being soldered; cemented; welded; tin can sealed construction; heat sealed; adhesively sealed; cementingly sealed; dry sealed; mechanically sealed and the like.

FIG. 23 shows that the bezel-like member 141 is shown with a hooking lip, which is integral and completely around the perimeter of the dished down bezel-like member 141. Shown is a nut 29 which is welded to the inside of the receptacle 103 or 31, which is made of a metal material, in this case, and bolt 30 removably secures the hanger 27 to the receptacle 31 side portion. The openings 148, shown in FIG. 22, are thereby used and are therein when this arrangement or construction is used. The receptacle 103 upper side portion is thereby sealed thereinside the lip of bezel-like member 141.

FIG. 24 shows that the bezel-like member 141 is dished downwardly and has a groove which is in the perimeter and which is sealingly generally capped on the upper perimeter side edge of receptacle 103. The groove (not numbered) thereby positively retains the upper perimeter edge of receptacle 103, therein. The right view, shown in FIG. 24 shows a bead-shaped top edge on receptacle 103, whereby both receptacles are preferred to be made of a plastic or an elastomer material as is the bezel 143, which also has an integral upstanding rim 131 on its upper portion for retaining fluid which may drip on top of the bezel-like member 141.

FIG. 25 shows a dished-in bezel-like member having an integral downwardly formed, projecting rib which is used for being fitted inside the receptacle 103 and against the inside side portion of the receptacle.

FIG. 26 is another construction and arrangement of a bezel-like member substantially as disclosed in FIG. 24, the left view thereof, and having the lip 131 therein.

FIG. 27 shows a one-piece bezeled receptacle 103 or 150 wherein the receptacle 150 is a fluid impermeable elastomer receptacle, which may also be made of metal or a plastic material if desired. The integral surrounding and upstanding, dashed-line outline, rib 131 which prevents the leaking fluid from flowing down the outside of receptacle 103 and/or 150, as previously disclosed.

FIG. 18 shows a flat washer 152 and 154, whereby 152 washer is fluid impermeable and oil resistant and 154 washer is fluid impermeable. The polygonal receptacle 103, has upstanding side walls which are integrally connected at all four corners and to the bottom wall portion, entirely all around. An integral surrounding seat upon which the washer 154 rests and the upstanding flange 142 is formed sealingly over and onto the washer 154. A sealing material, a cement, and the like can also be thereon the disclosed washer for creating a, fluid impermeable, sealed seam. The seam can be tin can sealed, mechanically sealed, and the like, sealingly thereon. If a foil material is used then the lip 142 can be, for example, finger manipulated, for sealing and opening up the seam if so desired. When a material 6 is retained in the receptacle 103, for example, such as a rigid open-cell foam material, a semi-rigid open cell foam material and the like or a fibrous, hair or fiber bonded material, all being generally previously disclosed and if material 6 is somewhat rigid or semi-rigid, then the washer 154 must be removed to dispose of the material 6 and reinsert another, as desired, material 6 thereinto. The material 6 could also be cleaned if desired or deemed necessary and be flexible, soft, resilient and the like.

FIG. 29 shows a dished down washer 151 or 154 which forms a bezel-like member thereover the open-topped receptacle 103, and which is also retained therein a seam (not numbered). The seam is formed by folding over the upper end of the wall and corner portions of receptacle 31 and/or 103 material. The seam can be heat sealed, mechanically sealed, cementingly sealed and the like, if desired. The outwardly formed flange 142 has an opening therethrough, shown as "x" marks and a bolt 30 is inserted through and threaded into a nut 29, whereby a hanger 27 is made removably secured to the flange 142. The upper portion of hanger 27 is thereby removably secured by accessible bolt means thereto the disclosed first or second class motor vehicle, as desired. The receptacle 103 is as shown, or is with a material 6, material 121 and the like which may be retained therein or one of the materials 6 can actually be foamed therein, whereby the receptacle is a disposable package or unit and thereby only the hangers 27, bolts 30, washer 151, and nut 29, are reuseable, as desired.

FIG. 20 shows a dished down washer-like member 151 which creates a bezel-like effect and is removably secured to a surrounding, integral, outwardly formed flange 28, with a bolt 30, lock washer 50, and nut 29. The lower portion of hanger 27 is also removably secured to the washer 151 or receptacle 103 as disclosed in FIG. 62. The washer 151 can be cementingly sealed, heat sealed, gasket compound sealed, not sealed at all, mechanically sealed, as desired or deemed necessary. The washer 151 can thereby be used to retain a material 6 and to substantially retain the retained fluid therein, when the motor vehicle is out of level, started or stopped abruptly and the like, disclosed previously. The term, "out of level," is to signify that the motor vehicle is in a drive motion, up or down a steep hill, parked on an angle or in a drive motion and in a curved direction, for example, as down a curved road, speedway, highway, around a corner, and the like. Also FIG. 30, the right side view thereof shows the hanger having a formed snout 153, which has a threaded inside surface, whereby nut 29 is not necessary or needed if this type of supporting structure 27 is used. The threads can be heat treated or hardened if desired or deemed necessary and may also be formed opposite to that which is shown if desired or deemed necessary.

Figure 31:
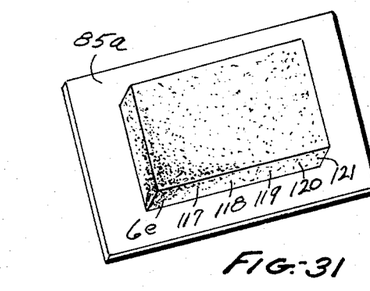
FIG. 31 is an isometric view of a sheet of material and having thereon its center portion a, material, earth or soil.
Figure 32:
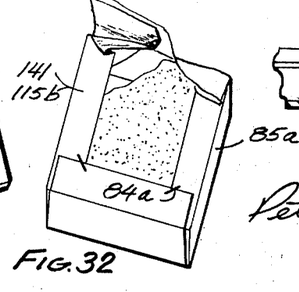
FIG. 32 is an isometric view of the sheet wrapped around the material shown in FIG. 31 and shown is an upper left corner of the wrapped package, that is unfolded in perspective.

FIG. 31 shows a film or sheet of oil resistant and fluid impermeable material 85, such as foil, various plastic materials and the like. The material 85 when made of a foil material, which is manually or hand or machine wrapped over the material 6, 117, 118, 119, 120, 121 and the like, as is shown in FIG. 32. When a sheet of plastic is used, for example, such as a thermoplastic material, and which can be heated to soften the material enough to allow its being folded over by hand or by machine if desired or deemed necessary. A thermosetting plastic material, which is machine made, may also be used, but may be more difficult to fold in the corners as shown.

FIG. 32 shows the receptacle retained material, which in this case, for example, is an open cell foam material 6 which may be rigid, semi-rigid, flexible and super-soft and the like, if desired. The view also shows a bezel 141 as being thereon. The bezel 115 is an integral bezel which would automatically be formed when the foil material, which is the preferred one herein, is hand-folded over one of the disclosed materials, as shown. The hand and finger manipulated foil material 85 will retain the retained fluid (not shown) up to the top of the bezel 115. The foil 85 is so arranged and folded that when, for example, the first or second class motor vehicle is out of level, the retained dripped in fluid is still retained in the foil receptacle 85 and until the fluid actually flows over the inside exposed edge of the foil which is over the retained, for example, foam material. The paper of box staples 85 may be located as close to the foil edge as possible. A cement, adhesive and the like could also be used for retaining the corners and folds in a closed position. The sheet 85, if made from a plastic material, could be vacuum-formed with upstanding sides, whereby the material 6 and the like, could be placed therein and the upstanding, integral sides would then be heat formed down and over and thereonto, to create the bezel 115. If a thin plastic film or sheet is used, then the material 6 and the like could be hand wrapped as shown and the corners can be heat sealed, stapled, or cemented as desired. The bezel 141 would, in this case, be a strip of oil resistant and fluid impermeable, adhesively backed material which is applied to the sides of the receptacle 85 and over and on the retained material 6 to thereby form a fluid impermeable bezel 141.

This latter portion of this specification contains further descriptive, detailed materials, coatings, receptacle and device-retaining means, coatings and the like which may be necessary for a more detailed specification. Fabrics which are woven and non-woven are used for the outside, inside, or core of a fluid retaining receptacle and are to be plastic or elastomer-coated as desired or deemed necessary for creating fluid impermeability. Nylon which is coated with Buna N also makes a good barrier for the retained fluids. Elastomers such as natural rubber, SBR, Polyurethane, Nitril, Polysulfide, Polyacrylate, Fluorocarbon and the like are to be used as desired or deemed necessary for a coating, boot, sleeve, bag, coatings and the like, for the oil resistant and fluid impermeable receptacles which are reusable or disposable and are with or without bezels thereon. The fluid retaining receptacles could have an open cell foam material foamed therein if so desired and loose or bonded fibers of hair, man-made metal, and the like and with oil resistant, elastomer or plastic material as a binder.

When hydrocarbons, oxides of nitrogen and the like, are emitted from the dripped fluid which is thereon a hot, sun heated surface, or is exposed to the hot sunlight, a photochemical reaction produces irritants and haze. When these by-products are retained in an area by climatic conditions or topographical barriers, the concentration of irritants can produce severe discomfort. The Los Angeles basin has all the necessary ingredients to produce such conditions about 100 days per year.

In this time period of ever increasing vehicular drive and high speed traveling, whereby an ever-increasing amount of vehicles are estimated (25,000,000) to be on the highways, thruways, freeways, turnpikes, streets, roads and the like, by 1972. This is an indicator to provide safer, cleaner and uncontaminated surface on which all persons must travel and this is a basis for this very important and needed for at least the combination receptacle device and which a great many persons will wish that they had thereon their motor vehicles, but they at present are not aware that such an invention may be obtained or is about to be disclosed.

Fabricated wire used for the baskets and the like supporting structure may, for example, be coated with polyvinyl chloride, by a powder fusion technique, known to the art as fused thereon by passing through a heat zone wherein dry flowing powders of vinyl chloride homopolymers and copolymers are used. The supporting structure being crates or the baskets may, for example, also be coated, as are dishracks and the like, with a plastic or elastomer material. This is primarily for corrosion resistance and appearance thereof as desired or deemed necessary and providing that the crate or basket is not already made of a plastic material and the like.

Some of the open-cell foam material is made from latex rubber, Polyvinyl, polyether urethane, polyurethane, chloride, polyester, polyepoxies, vinyl, phenolic, polyolefin, silicone, and the like which are, or may be, rigid or semi-rigid or flexible or super soft and used as desired or deemed necessary depending, for example, upon the material used for the receptacle 31, 85, 103 and the like. A synthetic elastomer or an elastomer sprayed fluid impermeable outer coating may also be used or a shell, boot, sleeve, made from the elastomers disclosed above and the like may be used. A coating, for example, called Hypalon may also be used if desired or deemed necessary.

Since glass fibers are the fastest growing, and their applications are almost entirely industrial and are oil resistant and heat resistant whereby they are preferred to be used as a filler material in the plastic receptacles, if desired. Of course, other fibers may be used such as asbestos, sisal, cotton, jute, man-made and metallic fibers. The resin used especially for bonding means is preferred to be polyesters but epoxies phenolics and silicones are also to be considered as desired or deemed necessary.

High impact polystyrene coated with an oil resistant coating, high density polyethylene, impact polypropylene, cellulose-acetate-butyrate, acrylonitrite-butadiene-styrene (coated as disclosed) polyester glass-fiber, a thermosetting monomer, and the like, may also be considered for making the receptacle device 2, or the said receptacle, if desired or deemed necessary.

Strapping of the fluid impermeable receptacle devices in, on or to means being in operative association with a motor vehicle supporting structure may be made mostly by use of flat steel, flat fabric, round steel, etc. which are twisted, crimped, spot welded, punch the ends together, metal clips, buckles, and the like. Rope twine, pressure-sensitive tape, reinforced tape, rayon, nylon, and other non-metal materials can be used. A material called Dymax is also very desired or as deemed necessary for it has a molecular structure which is oriented to combine unusually high strength with resilience and it resists oils, greases and the like, which is very desired.

The polygonal, rectangular, square, round troughty, triangular, or other polygonal configurations of the receptacle's shape and the like are and will be apparent to those skilled in the art once this invention is disclosed of its importance and need thereof by all as mentioned in the objects. The receptacles are to have square, rounding, sharp, blunt, and the like shape which integrally merge the rectilinear, curvilinear or other suitable corners, bends, and the like, portions thereof as desired.

The plastic film or sheet which can also be hand nested therein the fluid permeable basket or crate, or a fabric receptacle which is made fluid impermeable by hand nesting a film therein or a preformed, film, receptacle for retaining the leaked fluid therein. Some of these films or sheets are, cellophane, polyethylene polyester, polypropylene, polyvinylidene chloride (designated hereafter as PC) and polyurethane, which can be laminated to other thermoplastics and vacuum formed to create oil resistance if necessary is very good for vacuum forming of a receptacle. Laminations of PC-chloride, nylon, and polyester films are also to be used as desired. The combination of a polymer coating with a polyester sheet is also very desirable for an oil resistant and fluid impermeable receptacle for the retained fluid. Polycarbonates coated with polyethylene or PC-chloride is also good and is to be considered or desired.

The material 6, retained therein the receptacle 31, 85, or 103 is any of the described air permeable materials 6 disclosed in the divisional applicating having sheet 1, and also the following materials: Earth, which is defined as being one or any combination of the following: sand, clay, mud, soil, ordinary garden soil or top soil, fullers earth, dirt, marine mud, diatomaceous earth, and the like, wherein hydrocarbon consuming or utilizing bacteria are found or will exist. The material 6 is also to be considered as being, a rug or plush-like material which has upstanding piles which tend to wick the fluid therefrom its rug or plush base; a material which has a high surface tension toward water but readily absorbs oil and is called Buss-Bed-ding and is used for keeping fish bait and worms alive, U.S. Pat. No. 2,790,716, and will also be covered as such by this invention, for also preserving and feeding the disclosed bacteria as desired or deemed necessary; an open cell foam material, which is flexible, semi-rigid, rigid, and super soft such as a so-called Scott foam; microcrystalline cellulose in pellet form, sheet form and the like which is fluid absorbent, and the disclosed cellulose having microcrystals which are rehydrogen bonded together, and is a spongy, porous, random fine structure; iron oxide, and also the following materials having, or are made of, cotton waste, cotton, cellulose, cellucotton, a felt-like material, felt material, a sandwich layered construction, a layered material having a variable degree of density per layer for adsorbing and absorbing the retained fluid therein and arranged as desired or deemed necessary; chopped-up paper or cardboard; a stratum layered material for adsorbing and absorbing the retained fluid therein; cotton-rayon; layer of absorbent fibers; disintegrated wood pulp fibers; comminuted wood pulp fibers, a material which is treated with oil, whereby the retained dripped in oil or fluid is readily accepted, but water and the like is not; a material 6 consisting of rag waste; cotton linters; absorbent cotton; thermoplastic fibers; thermosetting plastic fibers; glass fibers; a honeycombed configurated material with upwardly exposed cells and having round, square, hexagonal, isotropic, triangular, and the like and made of ceramic such as pyroceram and crystallized glass and the like; also of glass; asbestos-reinforced plastic; oil resistant plastic; metal; oil treated paper material; a fibrous material, with or without a bonding agent for bonding its fibers together; a fibrous layer containing bonded activatable fibers; an oil resistant bonding agent of thermoplastic fiber; an oil resistant bonding agent of elastomer material such as neoprene and the like. Material 6 can also be homosote, rock wool, vermiculite, fibrous asbestos, wool, leather fibers, silk waste, wool waste, steel wool, copper wool, aluminum wool, foil wool, a hair fiber having a neoprene binder or any wood pulp by-product and the like. The material 6 which receives at least one portion of the dripped in fluid or oil from an underpart portion of a motor vehicle is also to be quilted or mattress construction having an absorbent core and thereby it is disposable with the retained fluid or residue thereof therein.

The rate of oxidation and thickening of the dripped in and receptacle retained fluid can be further increased by adjusting the shape of the fluid receptacle means. Thereby the attack on, over and through, by the forced drafting of air, created by the motor vehicle's forward drive motion is greatly increased.

Some of the thermoplastics that are to be used as desired being plain, filled, reinforced and the like or found useful herein this invention are ABC plastic, Acetal Resins, Acrylics, Cellulosics, Chlorinated Polyethers, Fluoro-carbons, Polyomides (Nylon) Polyethylene Resins, Polycarbonates, Polypropylenes, Styrene Polymers and Copolymers, Vinyls and the like. Thermosetting plastics that may also be desired being plain, filled, reinforced and the like are for example Alkyds, Allylics, Aminos, Epoxy Resins, Phenolics, Polyesters, Silicones, Urethanes, glass reinforced Epoxies, Vulcanized Fiber molded Fiber Glass reinforced plastic and the like which are known to the persons skilled in the plastic art. The molding, casting, extruding, blow molding, cold molding, compression molding, extrusion molding, injection molding, flow molding, jet molding, rotational molding, offset molding, transfer molding, slush molding, and the like are also to be considered for this invention, as desired. Sheet forming reverse forming, cavity forming, drape forming, plug assist forming, slip forming, snap back forming, vacuum forming, and the like may be used, if desired, and in reinforced plastics we have, autoclave molding, contact molding, matched-metal molding, pressure bag molding, spray molding, vacuum-bag molding, and the like. Chemical blowing and mechanical blowing may also be used for this invention, if desired. Low-pressure laminating and the like are also to be considered at least, retained, for the receptacles.

Hydrocarbon-utilizing bacteria, which utilize the described film or the hydrocarbons therein, for the primary purpose of gaining energy, for their life processes in much the same way that higher animals utilize carbohydrates, fats, and proteins. The bacteria are characterized by the ability to subsist upon various hydrocarbons as a sole source of organic matter in their diet. Hydrocarbons when utilized in this manner serve the identical purpose that they do when used in an internal combustion engine, the production of utilizable energy with which to do work. Specific catalysts are therein the bacteria and are also found in all living material. These naturally occurring catalysts are called enzymes. Enzymes are catalyst in exactly the same sense as are inorganic catalyst. Enzymes, like other catalyst, do not shift the equilibrium point of a reaction, but only hasten its attainment. The rate of enzyme-catalyzed reactions is approximately doubled for a 10° C rise in temperature, but from an engineering standpoint it is necessary to weigh this factor against the greater rate of destruction of enzymes at higher temperatures. The rate of bacterial action, in the receptacle or thereon the oil or fluid slick surface, previously described, will naturally depend, to a considerable degree, upon the total surface of hydrocarbon which they can attack and much more rapid activity will occur if the hydrocarbon surface is so dispersed as to give a large surface area, per unit of mass, since the bacteria live predominantly in the aqueous phase, and act only upon the hydrocarbon surface. The aerobic bacteria thereby also must have light; heat, from the sun; and atmospheric oxygen for supporting their system and growth as they utilize the oil slick surface or film.

Hydrocarbon consuming bacteria are to be contained, suspended, or inoculated into the material 6 if so desired or found necessary. If earth, which was previously defined herein, is the material 6 and it already has some, or a desired amount, or combination of hydrocarbon consuming bacteria therein, then the suspending, placing, or inoculation of bacteria will not be necessary for they are already therein the material 6. The earth, which is garden soil and the like as defined, generally need not have the bacteria inserted or inoculated therein for the earth itself possesses and is characterized as having substantial, retained fluid, absorbent, osmotic, permeable, and the like, qualifications or powers.

Micro-organisms, such as the described bacteria, and which thrive and reproduce rapidly on a diet of certain compounds in petroleum also tend to increase the rate of oxidation and thickening of the said retained fluid. Hydrocarbon-utilizing micro-organisms are ubiquitous in soil, stagnant water, in decaying matter and elsewhere upon the earth such as semi-arid desert soils as well. Obligate aerobes and anaerobic hydrocarbon-utilizing microorganisms are very important for use with this invention. They are found in soil, marine muds, and the like which can be used or placed in the receptacle thereof and device. The material 6 and the like are used in said receptacle 103, to reduce the fluid volume movement and increase the fluid consistency or to increase the rate of oxidation and thickening of the fluid therein the receptacle 2.

Water produced by hydrocarbon consuming bacteria will also at times be therein. Hydrocarbon consuming bacteria, contained therein the heated retained fluid would also utilize or consume the hydrocarbons because most bacteria have an optimum growth and metabolic temperature in the range of 20° to 40° C and are designated as mesophilic bacteria. Some of the hydrocarbon oxidizing bacteria grow best at ranges below 20° C and are designated, psychrophilic bacteria. The hydrocarbon utilizing bacteria which grow best at higher temperatures of 60° to 72° C are called thermophilic bacteria, but temperatures of 90° centigrade have been exposed to some bacteria, from marine muds, and which were still functional. In bubbling the heated exhaust gas through the retained fluid having therein, hydrocarbon hydrogen and carbon monoxide utilizing bacteria which oxidize the described substances to carbon dioxide and/or water and thereby the factors of temperature, oxygen and moisture are also very important for bacteria growth, whereby the retained fluid volume is reduced; the retained fluid is thickened; especially when the described bacteria also reduce the hydrocarbons, hydrogen and carbon monoxide to carbon dioxide and water. Thereby the carbon dioxide is carried off by the draughting air over the retained fluid and the water being, also dehydrated therefrom, thereby the same or an arid draught of air would be over the retained fluid as the receptacle 1 if the device is secured, and and, and the like, (described in the former portion of this specification) the described first class automotive vehicle and when the device is secured in a boat and under an oil pan and transmission of the inboard-outboard motor, having the generally inside bottom portion thereof for a receptacle supporting structure, if desired, whereby the device is still exposed to a draught of air. The bacteria mentioned above can be suspended, placed or inoculated into a material having the retained fluid which is therein, or in earth which is retained in an air permeable and fluid permeable material, in an open cell foam material, suspended on a carrier of porous structure, in a fibrous structure, or a man-made fibrous structure, placed between asbestos layers and the like which is retained in receptacle 103 and all being designated as material 6. The bacteria just described are called methanomonas methanica, Bacterium aliphaticum lique-faciens, Bacterium hidium and Bacillus oligocarbophilus and are areobic. Bacteria which grow in petroleum fluid are called anaerobic (oxygen is not required for their survival) and anaerobic techniques should be used if so desired or deemed necessary. Areboic hydrocarbon utilizing or consuming bacteria are preferred and must have oxygen for survival and thereby atmospheric oxygen is supplied from the bubbling air into or through the retained fluid and/or atmospheric oxygen from the air over the retained fluid or the draughting air, over, the retained fluid that is created by the forward drive motion of a motor vehicle. Hydrocarbon bacteria which consume or utilize petroleum and its constituents are also to preferably not to be human pathogens but some of the bacteria which might under unusual conditions be able to parasitize the human body are second choice of preference. Some of the human pathogen bacteria are known to be Nocardia, Actinomezces, Aspergillus, Debaryomyces, Endomyces, Monilia and Torulopsis. Since the fundamental nature of hydrocarbon utilization by microorganisms is one of oxidation, the availability of oxygen to the system (except when an anaerobes are involved) is an important factor, since it is known that petroleum products in the bottom of water reservoirs are only oxidized about one-tenth as fast as those on the surface. The amount of hydrocarbon oxidized by aerobes per unit of time is increased by improving the oxygen or atmospheric oxygen supply to the medium.

While several embodiments of this invention have been disclosed, it is understood that the inventive idea may be carried out in a number of ways. This invention is, therefore, not limited to the precise details described, but it is intended to cover all variations and modifications falling within the scope of the appended claims. Those skilled in the art who have my disclosure before them will be able to make modifications and variations therein without departing from the scope of the invention.

The foregoing description and the drawings are given to fully explain and illustrate the invention and is not to be limited thereto, except insofar as the appended claims are so limited.

What I claim as my combination invention is:

1. A fluid drip catcher receptacle device for a motor vehicle comprising in combination: a polygonal shaped substantially open topped fluid impermeable receptacle having a bottom wall and surrounding integral rectilinear side and end wall portions that merge into corner portions which integrally connect adjacent side and end wall portions together; said wall portions having their entire upper ends and corners formed integrally inwardly for forming a surrounding integral bezel-like flange; said receptacle having a separate material retained inside for said fluid; said receptacle having at least one portion of its inside surface imbued with an inorganic catalyst means for increasing the rate of oxidation and thickening of fluid therein.

2. A fluid drip catcher receptacle device for a motor vehicle comprising in combination: a polygonal shaped substantially open topped fluid impermeable receptacle having a bottom wall and surrounding integral rectilinear side and end wall portions that merge into corner portions which integrally connect adjacent side and end wall portions together; said wall portions having their entire upper ends and corners formed integrally inwardly for forming a surrounding integral bezel-like flange; said receptacle having a seaparate material retained inside for said fluid; said material having an inorganic catalyst means for increasing the rate of oxidation and thickening of petroleum fluid which drips therein from said motor vehicle.

3. A fluid drip catcher receptacle device for a motor vehicle comprising in combination: a polygonal shaped substantially open topped fluid impermeable receptacle having a bottom wall and surrounding integral rectilinear side and end wall portions that merge into corner portions which integrally connect adjacent side and end wall portions together; said wall portions having their entire upper ends and corners formed integrally inwardly for forming a surrounding integral bezel-like flange; said receptacle having a separate material retained inside for said fluid; said receptacle is inserted into a fluid impermeable bezel topped boot-like member.

4. A fluid drip catcher receptacle device for a motor vehicle comprising in combination: a polygonal shaped substantially open topped fluid impermeable receptacle having a bottom wall and surrounding integral rectilinear side and end wall portions that merge into corner portions which integrally connect adjacent side and end wall portions together; said wall portions having their entire upper ends and corners formed integrally inwardly for forming a surrounding integral bezel-like flange; said receptacle having a separate material retained inside for said fluid and at least one portion of the outer bottom wall of said receptacle has an adhesive means bonded thereon for adhesively bonding said receptacle to the surface of a material.

5. A fluid drip catcher receptacle device for a motor vehicle comprising in combination: a polygonal shaped substantially open topped fluid impermeable receptacle having a bottom wall and surrounding integral rectilinear side and end wall portions that merge into corner portions which integrally connect adjacent side and end wall portions together; said wall portions having their entire upper ends and corners formed integrally inwardly for forming a surrounding integral bezel-like flange; said receptacle having a separate material retained inside for said fluid; said material is soil which has therein a hydrocarbon consuming bacteria means for increasing the rate of oxidation and thickening of the fluid which drips into said soil from said motor vehicle.

6. A fluid drip catcher receptacle device for a motor vehicle comprising in combination: a polygonal shaped substantially open topped fluid impermeable receptacle having a bottom wall and surrounding integral rectilinear side and end wall portions that merge into corner portions which integrally connect adjacent side and end wall portions together; said wall portions having their entire upper ends and corners formed integrally inwardly for forming a surrounding integral bezel-like flange; said receptacle having a separate material retained inside for said fluid; said material is soil having aerobic hydrocarbon consuming bacteria therein.

7. A fluid drip catcher receptacle device for a motor vehicle comprising in combination: a polygonal shaped substantially open topped fluid impermeable receptacle having a bottom wall and surrounding integral rectilinear side and end wall portions that merge into corner portions which integrally connect adjacent side and end wall portions together; said wall portions having their entire upper ends and corners formed integrally inwardly for forming a surrounding integral bezel-like flange; said receptacle having a separate material retained inside for said fluid; said material is marine mud and having hydrocarbon consuming bacteria therein.

8. A fluid drip catcher receptacle device for a motor vehicle comprising in combination: a polygonal shaped substantially open topped fluid impermeable receptacle having a bottom wall and surrounding integral rectilinear side and end wall portions that merge into corner portions which integrally connect adjacent side and end wall portions together; said wall portions having their entire upper ends and corners formed integrally inwardly for forming a surrounding integral bezel-like flange; said receptacle having a separate material retained inside for said fluid; said material is substantially partitioned and having separate compartments which are open ended in at least one end thereof and are substantially upstanding towards said open topped portion of said receptacle.

9. The combination as set forth in claim 8 wherein said material having a honeycomb construction.

10. A fluid drip catcher receptacle device for a motor vehicle comprising in combination: a fluid impermeable receptacle having a bottom wall and integral rectilinear side wall portions that merge into corner portions which integrally connect adjacent side portions together; said receptacle having a material for said fluid retained therein; said material is fluid absorbent and having hydrocarbon consuming bacteria therein.

11. A fluid drip catcher receptacle device for a motor vehicle comprising in combination: a fluid impermeable receptacle having a bottom wall and integral rectilinear side wall portions that merge into corner portions which integrally connect adjacent side portions together; said receptacle having a material for said fluid retained therein; said material is an open cell foam material having a catalyst means for increasing the rate of oxidation and thickening of fluid therein.

12. A fluid drip catcher receptacle device for a motor vehicle comprising in combination: a fluid impermeable receptacle having a bottom wall and integral rectilinear side wall portions that merge into corner portions which integrally connect adjacent side portions together; said receptacle having a material for said fluid retained therein; said receptacle having an inorganic catalyst means on the inside bottom wall of said receptacle for increasing the rate of oxidation and thickening of the retained fluid and having said material on said catalyst means.

* * * * *